US012736907B2

(12) United States Patent
Kondoh

(10) Patent No.: US 12,736,907 B2
(45) Date of Patent: Sep. 15, 2026

(54) IMAGE FORMING APPARATUS AND ABNORMALITY DETERMINATION DEVICE

(71) Applicant: Tomohide Kondoh, Kanagawa (JP)

(72) Inventor: Tomohide Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 325 days.

(21) Appl. No.: 18/433,675

(22) Filed: Feb. 6, 2024

(65) Prior Publication Data

US 2024/0264558 A1 Aug. 8, 2024

(30) Foreign Application Priority Data

Feb. 8, 2023 (JP) ................................ 2023-017450

(51) Int. Cl.
*G03G 15/00* (2006.01)
*G03G 21/16* (2006.01)

(52) U.S. Cl.
CPC ......... *G03G 15/55* (2013.01); *G03G 21/1633* (2013.01); *G03G 21/1647* (2013.01)

(58) Field of Classification Search
CPC . G03G 15/55; G03G 21/1633; G03G 21/1647
See application file for complete search history.

(56) References Cited

U.S. PATENT DOCUMENTS

| | | | | |
|---|---|---|---|---|
| 6,185,773 | B1 * | 2/2001 | Goedde | G07C 9/28 340/5.1 |
| 2003/0030419 | A1 * | 2/2003 | Murakata | H02M 3/156 323/283 |
| 2017/0255152 | A1 | 9/2017 | Okamura et al. | |
| 2024/0004327 | A1 | 1/2024 | Yuji et al. | |

FOREIGN PATENT DOCUMENTS

| | | | | |
|---|---|---|---|---|
| JP | 2010-256557 | A | | 11/2010 |
| JP | 2020190694 | A | * | 11/2020 |
| JP | 2021-189371 | A | | 12/2021 |

* cited by examiner

*Primary Examiner* — Huo Long Chen
(74) *Attorney, Agent, or Firm* — IPUSA, PLLC

(57) ABSTRACT

An image forming apparatus includes an image former, a toner bottle holder, a bottle cover, a lock mechanism, a drive mechanism, an abnormality detector, a cover opening-and-closing detection sensor, and processing circuitry. The lock mechanism locks the bottle cover at a position at which the bottle cover covers an insertion port of the toner bottle holder. The drive mechanism drives the lock mechanism to release a locked state of the bottle cover. The abnormality detector generates an abnormality detection signal when the abnormality detector detects an abnormality of the drive mechanism. The cover opening-and-closing detection sensor detects an open state and a closed state of the bottle cover and generates a cover opening-and-closing detection signal indicating the open state or the closed state of the bottle cover. The processing circuitry determines an abnormal part of the drive mechanism based on the abnormality detection signal and the cover opening-and-closing detection signal.

5 Claims, 11 Drawing Sheets

FIG. 5

| FAILURE MODE | | (FIRST CONTROL STATE) FRONT DOOR IS CLOSED (OPCL2 = L) SOLENOID CONTROLLED TO BE TURNED OFF | | (SECOND CONTROL STATE) FRONT DOOR IS OPEN (OPCL2 = H) SOLENOID CONTROLLED TO BE TURNED ON | | (THIRD CONTROL STATE) FRONT DOOR IS OPEN (OPCL2 = H) SOLENOID CONTROLLED TO BE TURNED OFF | |
|---|---|---|---|---|---|---|---|
| | | ABNORMALITY DETECTION SIGNAL ABN | OPENING-AND-CLOSING DETECTION SIGNAL OPCL1 | ABNORMALITY DETECTION SIGNAL ABN | OPENING-AND-CLOSING DETECTION SIGNAL OPCL1 | ABNORMALITY DETECTION SIGNAL ABN | OPENING-AND-CLOSING DETECTION SIGNAL OPCL1 |
| NORMAL | | H | L | L | H | H | L |
| HARNESSES 421, 422 | (A) DISENGAGEMENT | L | L | L | L | L | L |
| | (A) DISCONNECTION | L | L | L | L | L | L |
| | (A) GROUND FAULT (SOURCE SIDE) | L | L | L | L | L | L |
| | (B) GROUND FAULT (SINK SIDE) | L | L | L | H | L | H |
| SOLENOID 410 | (C) OPEN | L | L | L | L | L | L |
| | (D) SHORT | H | L | L | L | H | L |
| TRANSISTOR 432 (BOARD) | (E) OPEN | H | L | H | L | H | L |
| | (F) SHORT | L | L | L | H | L | H |

IMAGE FORMING APPARATUS AND ABNORMALITY DETERMINATION DEVICE

CROSS-REFERENCE TO RELATED APPLICATION

This patent application is based on and claims priority pursuant to 35 U.S.C. § 119(a) to Japanese Patent Application No. 2023-017450, filed on Feb. 8, 2023, in the Japan Patent Office, the entire disclosure of which is hereby incorporated by reference herein.

BACKGROUND

Technical Field

Embodiments of the present disclosure relate to an image forming apparatus and an abnormality determination device.

Related Art

There is a technique in which a lockable bottle cover is provided at an insertion port of a holder of a toner bottle of an image forming apparatus, and the bottle cover is unlocked when the remaining amount of toner in the toner bottle runs out, to reduce the replacement of the toner bottle in a state where the toner remains. For example, a lock is released by moving a locking portion that locks the bottle cover in a closed state using a mechanism such as a solenoid.

There is a technique of inquiring a user whether the toner bottle has been replaced to distinguish between a failure of a lock mechanism and a failure of an opening-and-closing sensor of the bottle cover in a case where the opening-and-closing sensor of the bottle cover indicates the closed state after the lock of the bottle cover is released.

SUMMARY

According to an embodiment of the present disclosure, an image forming apparatus includes an image former, a toner bottle holder, a bottle cover, a lock mechanism, a drive mechanism, an abnormality detector, a cover opening-and-closing detection sensor, and processing circuitry. The image former forms an image. The toner bottle holder holds a toner bottle filled with toner used for image formation by the image former in a manner that the toner bottle is insertable to and removable from the toner bottle holder. The bottle cover covers an insertion port of the toner bottle holder and is openable and closable with respect to the insertion port. The lock mechanism locks the bottle cover at a position at which the bottle cover covers the insertion port. The drive mechanism drives the lock mechanism to release a locked state of the bottle cover. The abnormality detector generates an abnormality detection signal when the abnormality detector detects an abnormality of the drive mechanism. The cover opening-and-closing detection sensor detects an open state and a closed state of the bottle cover and generates a cover opening-and-closing detection signal indicating the open state or the closed state of the bottle cover. The processing circuitry determines an abnormal part of the drive mechanism based on the abnormality detection signal and the cover opening-and-closing detection signal.

According to another embodiment of the present disclosure, an abnormality determination device determines an abnormal part of a drive mechanism and is to be installed in an apparatus including: a toner bottle holder to hold a toner bottle filled with toner in a manner that is insertable to and removable from the toner bottle holder; a bottle cover that covers an insertion port of the toner bottle holder and is openable and closable with respect to the insertion port; a lock mechanism to lock the bottle cover at a position at which the bottle cover covers the insertion port; and a drive mechanism to drive the lock mechanism to release a locked state of the bottle cover; and a cover opening-and-closing detection sensor to detect an open state and a closed state of the bottle cover and generate a cover opening-and-closing detection signal indicating the open state or the closed state of the bottle cover. The abnormality determination device includes an abnormality detector and processing circuitry. The abnormality detector generates an abnormality detection signal when the abnormality detector detects an abnormality of the drive mechanism. The processing circuitry receives the cover opening-and-closing detection signal from the cover opening-and-closing detection sensor and determines the abnormal part of the drive mechanism based on the abnormality detection signal and the cover opening-and-closing detection signal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is an explanatory table illustrating an example of logical values of an abnormality detection signal and an opening-and-closing detection signal generated according to a drive state of a lock mechanism by a drive mechanism of FIG. 3;

Figure 1:
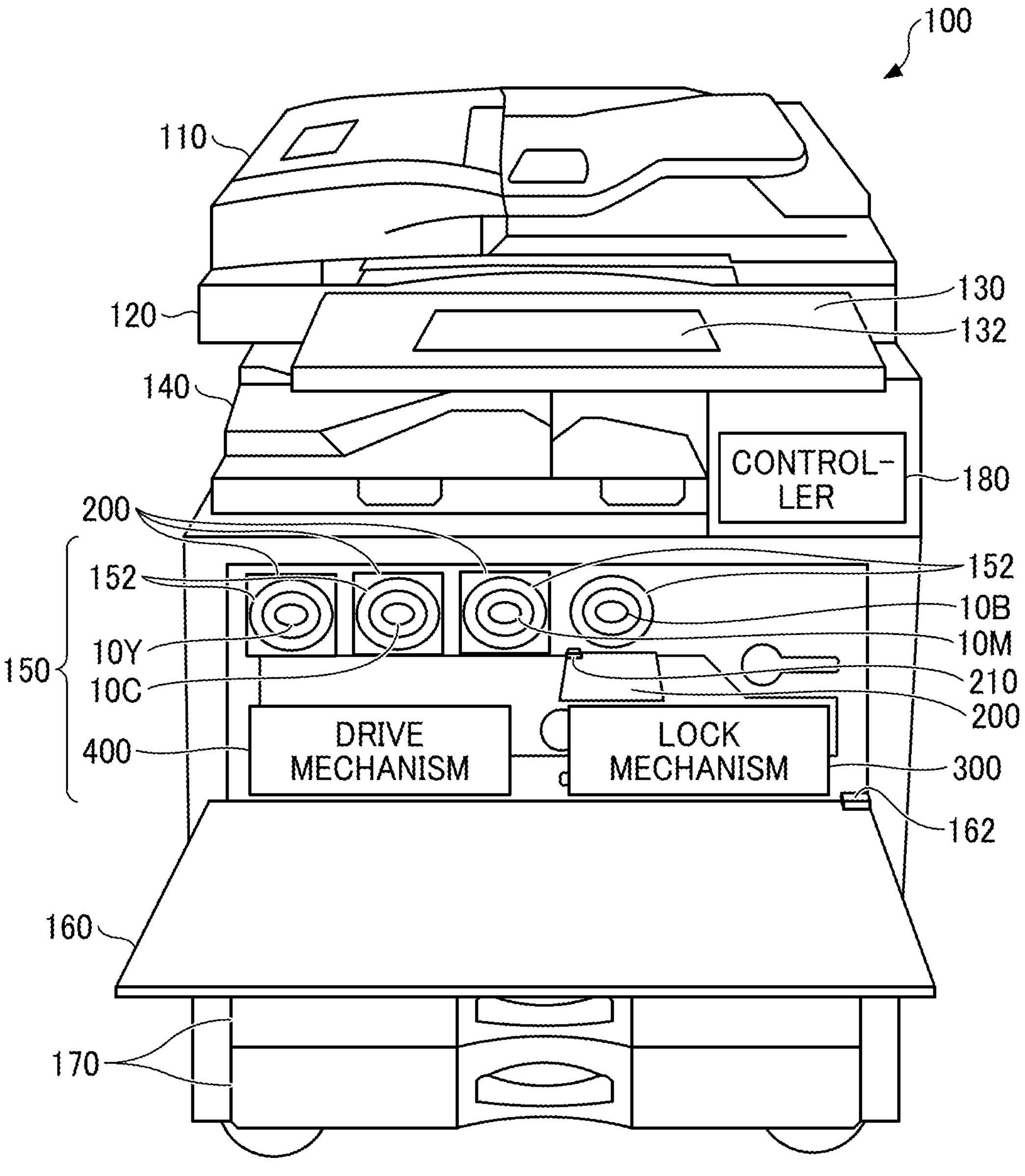
FIG. 1 is an overall configuration diagram illustrating an example of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments will be described with reference to the drawings. In the drawings, the same reference signs are given to the same components, and redundant explanation is omitted in some cases.

FIG. 1 is an overall configuration diagram illustrating an example of an image forming apparatus according to one embodiment of the present disclosure. For example, an image forming apparatus 100 is a multifunction peripheral/printer/product (MFP) including a copy function, a facsimile (FAX) function, a print function, a scanner function, etc. An image processed by the image forming apparatus 100 may include not only image data including the image but also text data not including any image.

The image forming apparatus 100 is a so-called electrophotographic image forming apparatus. The image forming apparatus 100 includes an automatic document feeder 110, an image reading device 120, an operation unit 130, a sheet tray 140, an image formation unit 150, a front door 160, a sheet feeding cassette 170, and a controller 180 that controls the overall operation of the image forming apparatus 100. In practice, the controller 180 is provided in a main body of the image forming apparatus 100, for example, in a form of a control board.

The automatic document feeder 110 feeds documents one by one to the image reading device 120. The image reading device 120 generates image data by optically reading image information of each document sequentially sent from the automatic document feeder 110. Further, the image reading device 120 can generate image data by optically reading a document placed on a transparent document table.

The operation unit 130 includes an operation panel 132 that receives various inputs according to a user's operation and displays various types of information. The operation panel 132 is an example of a display unit. For example, the information displayed on the operation panel 132 includes information indicating an operation of receiving an input, information indicating an operation status of the image forming apparatus 100, information indicating a setting state of the image forming apparatus 100, various alarms, and the like. The various alarms include display of a service call for urging a request for repair to a service base of the image forming apparatus 100 when the image forming apparatus 100 detects an abnormality of an internal mechanism. The display of the service call is an example of a message indicating that repair is necessary.

For example, the operation panel 132 may include a liquid crystal display (LCD) or an organic electro-luminescence (EL) display having a touch panel function. Further, the operation panel 132 may include a hardware key or the like in addition to a display having a touch panel function.

The image formation unit 150 includes a photosensitive drum, a charging device, a writing unit, a developing device, a conveying belt, a fixing device, and the like. The image formation unit 150 is an example of an image former or an image forming device. The charging device charges an outer peripheral surface of the photosensitive drum. The writing unit exposes the charged photosensitive drum and writes an electrostatic latent image on the photosensitive drum based on an image data read by the image reading device 120.

The developing device develops the latent image written on the photosensitive drum with a toner. The conveying belt conveys a sheet on which a toner image is to be formed to the photosensitive drum, and transfers a toner image attached to the photosensitive drum by development to the sheet. The fixing device fixes the toner image on the sheet to the sheet to form the toner image on the sheet. Then, the sheet on which the toner image is formed is discharged to the sheet tray 140.

Figure 2:
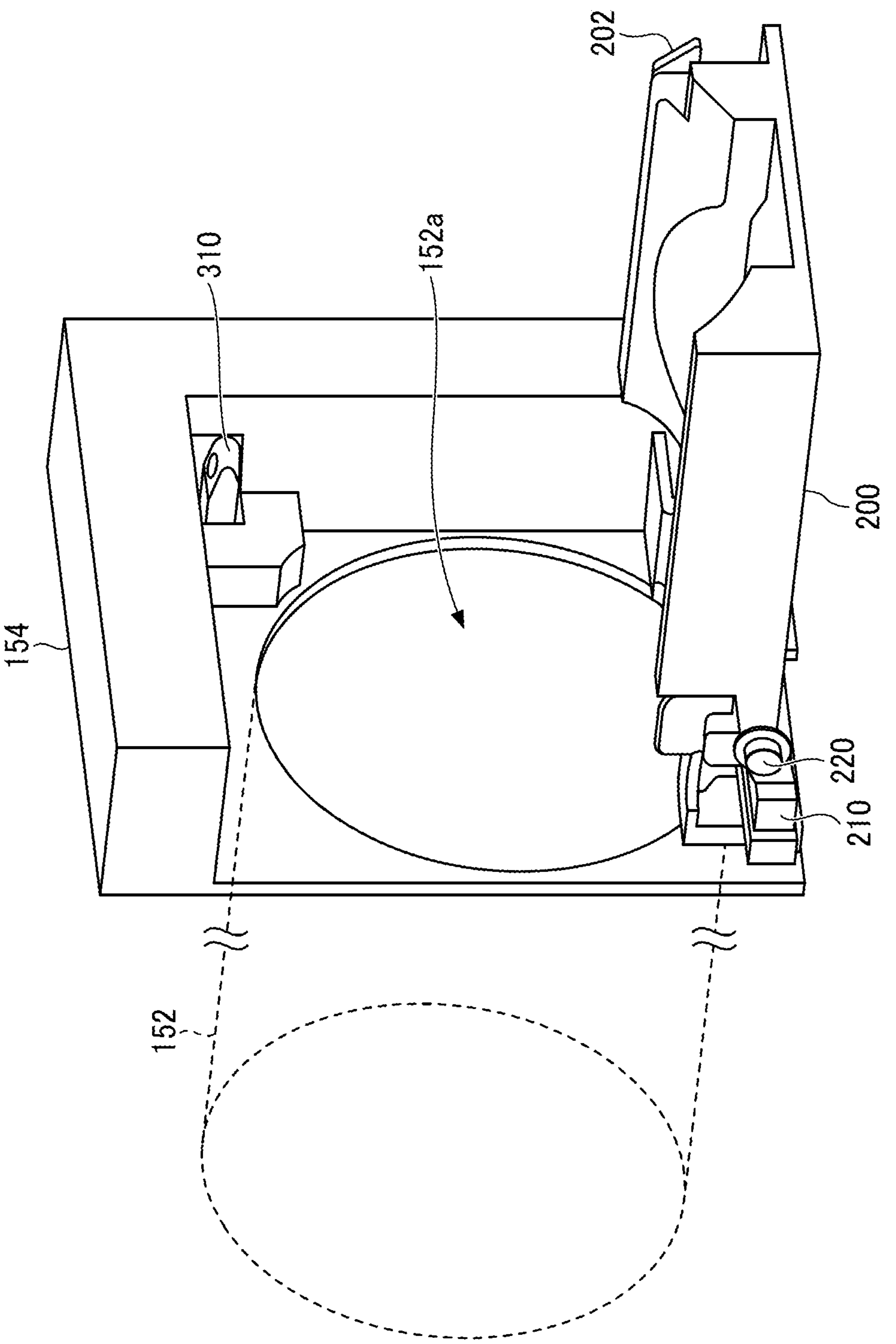
FIG. 2 is a partial perspective view illustrating an example of a bottle cover provided in a toner bottle holder of FIG. 1.
Figure 3:
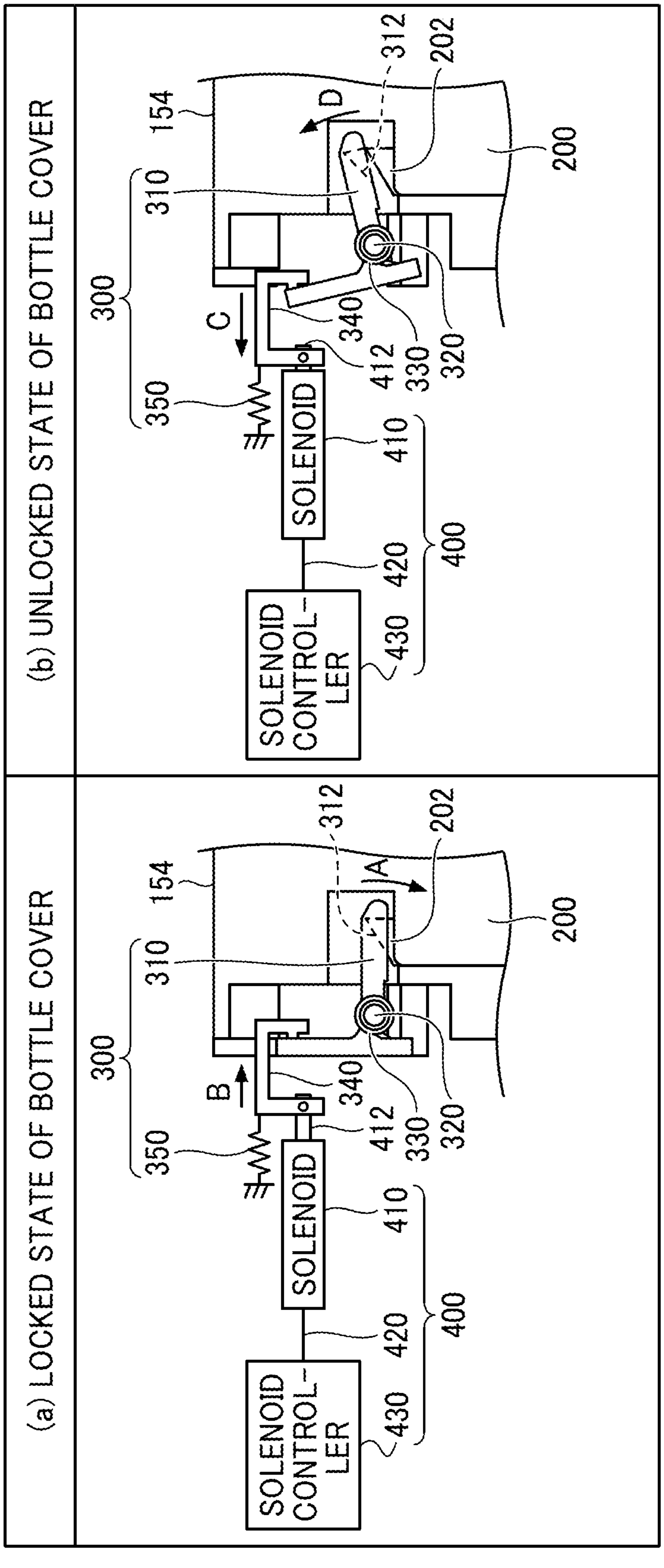
FIG. 3 is an explanatory diagram illustrating an example of a locked state and an unlocked state of a bottle cover of FIG. 2.

The image formation unit 150 includes, for example, a toner bottle holder 152 that holds each of toner bottles 10Y, 10C, 10M, and 10B filled with yellow, cyan, magenta, and black toners, respectively. Hereinafter, the toner bottles 10Y, 10C, 10M, and 10B are also referred to as toner bottle 10 when described without distinction. In addition, the image formation unit 150 includes a bottle cover 200 openably attached to an insertion port 152*a* (FIG. 2) of the toner bottle 10 in each toner bottle holder 152, an opening-and-closing detection sensor 210, a lock mechanism 300, and a drive mechanism 400. The opening-and-closing detection sensor 210 detects an open state and a closed state of the bottle cover 200. The lock mechanism 300 locks the bottle cover 200 at a position at which the bottle cover 200 covers the insertion port 152*a* (FIG. 2) of the toner bottle 10. The drive mechanism 400 releases the locked state of the bottle cover 200 by the lock mechanism 300 to open the bottle cover 200. An example of the lock mechanism 300 is illustrated in FIGS. 2 and 3, and an example of the drive mechanism 400 is illustrated in FIG. 3.

In FIG. 1, the bottle cover 200 attached to a front surface of the toner bottle holder 152 of each of the toner bottles 10Y, 10C, and 10M is illustrated in a closed state, and the toner bottle holder 152 is illustrated in a transparent manner for easy understanding of the description. The bottle cover 200 attached to the front surface of the toner bottle holder 152 of the toner bottle 10B is illustrated in an open state.

A front door 160 is attached to a front surface of the image formation unit 150 and can be opened and closed by a user or the like. FIG. 1 illustrates a state where the front door 160 is opened. An opening-and-closing detection sensor 162 that detects an open state a closed state of the front door 160 is attached to the front door 160. The opening-and-closing detection sensor 162 is an example of a door opening-and-closing detection sensor. The bottle cover 200 can be completely opened in a state where the front door 160 is open. In a state where the front door 160 is closed, the movement of the bottle cover 200 is restricted by the front door 160, and the bottle cover 200 cannot be completely opened. Therefore, when the front door 160 is closed, the opening-and-closing detection sensor 210 detects the closed state of the bottle cover 200 even when the locked state of the bottle cover 200 is released. The opening-and-closing detection sensor 210 is an example of a cover opening-and-closing detection sensor.

The controller 180 is implemented by, for example, a controller such as a central processing unit (CPU) mounted on the control board. The controller 180 may detect the open state and the closed state of the bottle cover 200 and the open state and the closed state of the front door 160 based on information received from the opening-and-closing detection sensors 210 and 162. The controller 180 may be implemented by a system on chip (SoC), a field-programmable gate array (FPGA), or the like. For example, the controller 180 controls the image forming apparatus 100 and performs a copy operation or the like based on operations received on the operation panel 132. Furthermore, the controller 180 may control the image forming apparatus 100 based on an instruction received from an external device such as a personal computer (PC).

The sheet feeding cassette 170 stores a sheet or the like before a toner image is formed. For example, the sheet feeding cassette 170 can store sheets or the like having different sizes. FIG. 1 illustrates an example in which two sheet feeding cassettes 170 are provided in the image forming apparatus 100, but the number of sheet feeding cassettes 170 may be one or three or more.

FIG. 2 is a partial perspective view illustrating an example of the bottle cover 200 provided in the toner bottle holder 152 of FIG. 1. For example, a frame portion 154 to which the bottle cover 200 is attached is fixed to the front surface of the toner bottle holder 152. The frame portion 154 has a through hole through which the toner bottle 10 can be inserted at a position facing the insertion port 152*a* of the toner bottle 10 in the toner bottle holder 152. Further, a latch 310 included in the lock mechanism 300 and the opening-and-closing detection sensor 210 are attached to the frame portion 154. Although not particularly limited, the latch 310 and the opening-and-closing detection sensor 210 are provided at diagonal positions of the rectangular frame portion 154 with the insertion port 152*a* interposed therebetween.

The bottle cover 200 is disposed at a position to cover the insertion port 152*a* when closed, and is rotatably fixed to the frame portion 154 by a shaft member 220. The bottle cover 200 has a hook 202 protruding from a tip portion at the tip portion opposite to an end portion that rotates with the shaft member 220. The hook 202 is provided at a position to be engaged with the latch 310 in a state where the bottle cover 200 is closed to cover the insertion port 152*a*. The detailed shape and manner of engagement of the latch 310 and the hook 202 will be described with reference to FIG. 3.

FIG. 3 is an explanatory diagram illustrating an example of a locked state and an unlocked state of the bottle cover 200 of FIG. 2. The lock mechanism 300 illustrated in FIG. 1 includes the latch 310, a shaft member 320, a torsion coil spring 330, a link 340, and a coil spring 350. The drive mechanism 400 illustrated in FIG. 1 includes a solenoid 410, a control line 420, and a solenoid controller 430.

The latch 310 has an L shape, and is rotatably supported by the shaft member 320 provided at an L-shaped bent portion. Around the shaft member 320, the torsion coil spring 330 that presses one end of the L-shaped latch 310 in a direction A which is the bottle cover 200 side is disposed. The torsion coil spring 330 is an example of a pressing member.

A recess 312 having a shape corresponding to the shape of the hook 202 of the bottle cover 200 is provided on one end side of the latch 310. The hook 202 is restricted from moving with respect to the frame portion 154 in a state of being engaged with the recess 312 of the latch 310, and the bottle cover 200 is maintained in a closed state. The hook 202 is an example of a locking portion, and the recess 312 is an example of an engagement portion. The latch 310 is an example of an engagement member.

The inner side at the other end of the latch 310 is in contact with the inner side on one end side of the link 340 having a U-shape with an acute angle. The other end side of the link 340 is connected to a rod 412 of the solenoid 410. The coil spring 350 that presses the link 340 in a direction B which is the latch 310 side is attached to the link 340. The solenoid 410 is connected to the solenoid controller 430 via the control line 420 and is driven by the solenoid controller 430.

In a state (a) of FIG. 3, when the solenoid 410 is not driven by the solenoid controller 430, the rod 412 is movable. At this time, the latch 310 rotates in the direction A by the bending stress of the torsion coil spring 330, and engages the hook 202 by the recess 312. The link 340 moves in the direction B while maintaining the contact with the end of the latch 310 in accordance with the rotation of the latch 310 by the pressing force of the coil spring 350. Thus, the bottle cover 200 is locked to the frame portion 154 in a state of covering the insertion port 152*a* (FIG. 2) of the toner bottle 10.

In a state (b) of FIG. 3, the solenoid 410 pulls the rod 412 in a direction C when driven by the solenoid controller 430. Thus, the link 340 moves in the direction C, the other end of the latch 310 is pressed in the direction C, and the latch 310 rotates in a direction D against the bending stress of the torsion coil spring 330. Then, the hook 202 is released from the engagement by the recess 312, and the bottle cover 200 is released from the lock by the frame portion 154.

The bottle cover 200 has a structure in which the hook 202 rotates in a direction away from the frame portion 154 by gravity, spring force, and the like in a state where the lock by the frame portion 154 is released. Therefore, after the state (b), the bottle cover 200 is automatically opened. When the front door 160 of FIG. 1 is opened, the bottle cover 200 is completely opened, and the toner bottle 10 can be taken in and out from the insertion port 152*a* (FIG. 2). The opening-and-closing detection sensor 210 (FIG. 2) detects that the bottle cover 200 has been opened.

The solenoid controller 430 stops the drive of the solenoid 410 after the bottle cover 200 is opened. As a result, the link 340 and the latch 310 return to the positions illustrated in the state (a). When the toner bottle 10 is replaced and the bottle cover 200 is closed by the user, one end of the latch 310 is pressed by the hook 202. The latch 310 rotates in the direction D against the bending stress of the torsion coil spring 330 until the recess 312 engages the hook 202. Then, as illustrated in the state (a) of FIG. 3, the bottle cover 200 is locked again to the frame portion 154.

Figure 4:
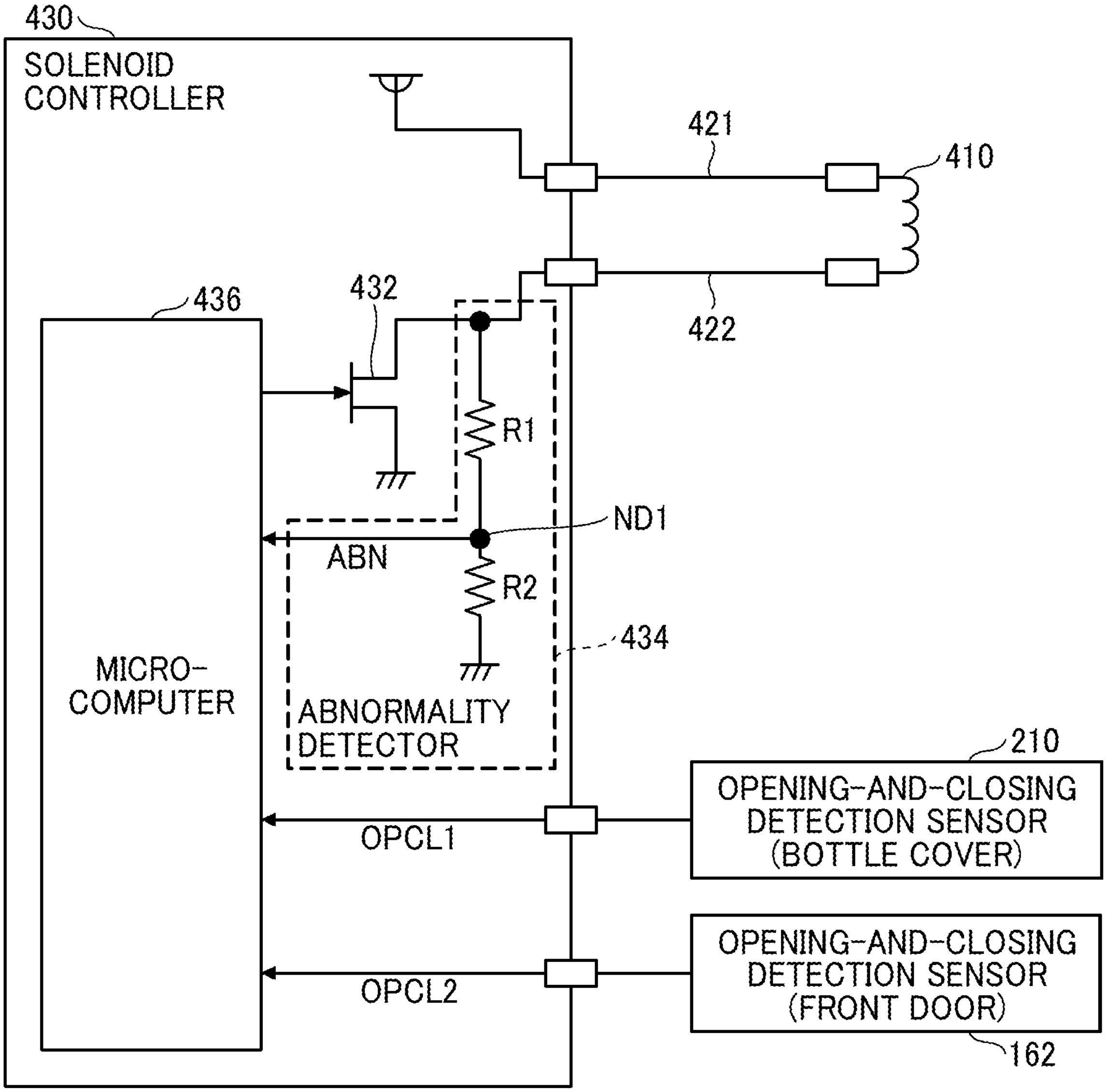
FIG. 4 is a circuit block diagram illustrating an example of a solenoid controller of FIG. 3.

FIG. 4 is a circuit block diagram illustrating an example of the solenoid controller 430 of FIG. 3. The solenoid controller 430 serving as an abnormality determination device includes a transistor 432, an abnormality detector 434, and a microcomputer 436, which are used to drive the solenoid 410. The solenoid 410 is connected to a power supply line and the transistor 432 via harnesses 421 and 422 corresponding to the control line 420 of FIG. 3, respectively.

A collector of the transistor 432 is connected to a sink side of the solenoid 410 via the harness 422. An emitter of the transistor 432 is grounded. A base of the transistor 432 is connected to the microcomputer 436.

The abnormality detector 434 provided in the solenoid controller 430 includes resistors R1 and R2 connected in series via a node ND1 between the collector of the transistor 432 and a ground line. The abnormality detector 434 divides a collector voltage of the transistor 432 by a voltage divider using the resistors R1 and R2, and outputs a divided voltage appearing at the node ND1 to the microcomputer 436 as an abnormality detection signal ABN. By outputting the divided voltage to the microcomputer 436, even when the power supply voltage exceeds the rated input voltage of the microcomputer 436, an appropriate voltage can be output to the microcomputer 436 as the abnormality detection signal ABN.

For example, the abnormality detector 434 generates a low-level abnormality detection signal ABN when the microcomputer 436 outputs a high level to the base of the transistor 432 and turns on the transistor 432 to drive the solenoid 410. The abnormality detector 434 generates a high-level abnormality detection signal ABN when the microcomputer 436 outputs a low level to the base of the transistor 432, turns off the transistor 432, and does not drive the solenoid 410. For example, when an open failure occurs in the harness 422, the abnormality detection signal ABN is set to a low level L regardless of whether the transistor 432 is turned on or off. When the abnormality detection signal ABN is fixed to a low level, the microcomputer 436 can detect an abnormality of the drive mechanism 400 (FIG. 3).

The microcomputer 436 controls the drive of the transistor 432. In addition, the microcomputer 436 receives the abnormality detection signal ABN, an opening-and-closing detection signal OPCL1 of the bottle cover 200 from the opening-and-closing detection sensor 210, and an opening-and-closing detection signal OPCL2 of the front door 160 from the opening-and-closing detection sensor 162. The opening-and-closing detection signal OPCL1 is an example of a cover opening-and-closing detection signal.

For example, the microcomputer 436 receives the abnormality detection signal ABN and the opening-and-closing detection signals OPCL1 and OPCL2 as high-level and low-level logic signals, respectively. The microcomputer 436 may convert the voltage of the abnormality detection signal ABN into a logic signal by a built-in analog-to-digital converter (ADC).

The microcomputer 436 may be provided in common for the four bottle covers 200 outside the solenoid controller 430. In this case, it is preferable that an ADC that converts the voltage of the abnormality detection signal ABN into a logic signal and outputs the logic signal generated by the conversion to the microcomputer 436 is provided in the solenoid controller 430.

The microcomputer 436 detects an abnormality of the solenoid 410, the harnesses 421 and 422, or the transistor 432 included in the drive mechanism 400 based on the abnormality detection signal ABN and the opening-and-closing detection signals OPCL1 and OPCL2. The microcomputer 436 serving as processing circuitry is an example of a determination unit that determines an abnormal part of the drive mechanism 400.

FIG. 5 is an explanatory diagram illustrating an example of logical values of the abnormality detection signal ABN and the opening-and-closing detection signals OPCL1 and OPCL2 generated according to the drive state of FIG. 3 of the lock mechanism 300 by the drive mechanism 400. The microcomputer 436 of FIG. 4 acquires logical values of the abnormality detection signal ABN and the opening-and-closing detection signal OPCL1 in each of the first control state, the second control state, and the third control state of FIG. 5, and determines an abnormal part of the drive mechanism 400 based on the acquired logical values. Hereinafter, failures will be described as single failures.

The first control state is a state in which the front door 160 is closed and a state in which the solenoid 410 is controlled to be turned off. The OFF of the solenoid 410 is a state in which the transistor 432 is controlled to be turned off. The second control state is a state in which the front door 160 is open and a state in which the solenoid 410 is controlled to be turned on. The on of the solenoid 410 is a state in which the transistor 432 is controlled to be turned on. The third control state is a state in which the front door 160 is open and a state in which the solenoid 410 is controlled to be turned off.

In a case where there is an abnormality in the drive mechanism 400, the solenoid 410 may be turned on even when the solenoid 410 is controlled to be turned off, and the solenoid 410 may be turned off even when the solenoid 410 is controlled to be turned on. Similarly, in a case where there is an abnormality in the drive mechanism 400, the transistor 432 may be turned on even when the transistor 432 is controlled to be turned off, and the transistor 432 may be turned off even when the transistor 432 is controlled to be turned on.

In the first control state and the third control state in which the solenoid 410 is controlled to be turned off in a normal state, the solenoid 410 is not driven, the hook 202 of the bottle cover 200 is engaged with the recess 312 of the latch 310, and the bottle cover 200 is in a closed state. Since the solenoid 410 is not driven, the sink side of the solenoid 410 is maintained at a high level, and the abnormality detection signal ABN is set to the high level H. Since the bottle cover 200 is in the closed state, the opening-and-closing detection signal OPCL1 is set to the low level L.

In the second control state in which the solenoid 410 is turned on in a normal state, the solenoid 410 is driven, the engagement of the hook 202 of the bottle cover 200 by the recess 312 of the latch 310 is released, and the bottle cover 200 is in an open state. Since the sink side of the solenoid 410 is maintained at a low level by turning on the transistor 432, the abnormality detection signal ABN is set to the low level L. Since the bottle cover 200 is in the open state, the opening-and-closing detection signal OPCL1 is set to the high level H.

A case where one or both of the harnesses 421 and 422 are disengaged or disconnected and a case where a ground fault (source side) occurs in the harness 421 are defined as a failure mode (A). In the failure mode (A), the abnormality detection signal ABN is set to the low level L regardless of whether the transistor 432 is turned on or off. Further, since the solenoid 410 is not driven even when the transistor 432 is turned on, the engagement between the hook 202 of the bottle cover 200 and the latch 310 is not released. Therefore, the bottle cover 200 is in the closed state, and the opening-and-closing detection signal OPCL1 is set to the low level L.

A case where a ground fault (sink side) occurs in the harness 422 is defined as a failure mode (B). In the failure mode (B), the abnormality detection signal ABN is set to the low level L regardless of whether the transistor 432 is turned on or off. In addition, the solenoid 410 is driven by a current which flows regardless of whether the transistor 432 is turned on or off, and the engagement between the hook 202 of the bottle cover 200 and the latch 310 is released.

Therefore, in the second control state and the third control state in which the front door 160 is open, the bottle cover 200 is open, and the opening-and-closing detection signal OPCL1 is set to the high level H. On the other hand, in the first control state in which the front door 160 is closed, the bottle cover 200 is blocked and closed by the front door 160, and the opening-and-closing detection signal OPCL1 is set to the low level L.

A case where an open failure occurs in the solenoid 410 is defined as a failure mode (C). In the failure mode (C), the solenoid 410 is turned off regardless of whether the transistor 432 is turned on or off. Therefore, similarly to the failure mode (A), the abnormality detection signal ABN is set to the low level L, and the opening-and-closing detection signal OPCL1 is set to the low level L.

A case where a short-circuit failure occurs in the solenoid 410 is defined as a failure mode (D). In the failure mode (D), the solenoid 410 is not driven, but a current flows to the abnormality detector 434 via the solenoid 410. Therefore, in the second control state in which the solenoid 410 (transistor 432) is controlled to be turned on, the abnormality detection signal ABN is set to the low level L. It is assumed that the on-current of the transistor 432 is larger than the current flowing through the abnormality detector 434 due to the short circuit of the solenoid 410.

In the first control state and the third control state in which the solenoid 410 (transistor 432) is controlled to be turned off, the abnormality detection signal ABN is set to the high level H. Since the solenoid 410 is not driven, the engagement between the hook 202 of the bottle cover 200 and the latch 310 is not released. Therefore, the bottle cover 200 is in the closed state, and the opening-and-closing detection signal OPCL1 is set to the low level L in the first control state, the second control state, and the third control state.

A case where an open failure occurs in the transistor 432 is defined as a failure mode (E). The open failure of the transistor 432 also includes a failure equivalent to an open failure of the transistor 432 caused by the board on which the transistor 432 is mounted.

In the failure mode (E), the solenoid 410 is not driven, but a current flows through the solenoid 410 to the abnormality detector 434. Therefore, the abnormality detection signal ABN is set to the high level H in the first control state, the second control state, and the third control state. Since the solenoid 410 is not driven, the bottle cover 200 is in the closed state, and the opening-and-closing detection signal OPCL1 is set to the low level L in the first control state, the second control state, and the third control state.

A case where a short-circuit failure occurs in the transistor 432 is defined as a failure mode (F). The short-circuit failure of the transistor 432 also includes a failure equivalent to a short-circuit failure of the transistor 432 caused by the board on which the transistor 432 is mounted. In the failure mode (F), regardless of the control state of the transistor 432, a current constantly flows between the collector and the emitter of the transistor 432, and the solenoid 410 is constantly driven. Therefore, the abnormality detection signal ABN is set to the low level L in the first control state, the second control state, and the third control state.

Since the solenoid 410 is constantly driven, the engagement between the hook 202 of the bottle cover 200 and the latch 310 is released. Therefore, similarly to the failure mode (B), the opening-and-closing detection signal OPCL1 is set to the low level L in the first control state in which the front door 160 is closed, and is set to the high level H in the second control state and the third control state in which the front door 160 is open.

Figure 6:
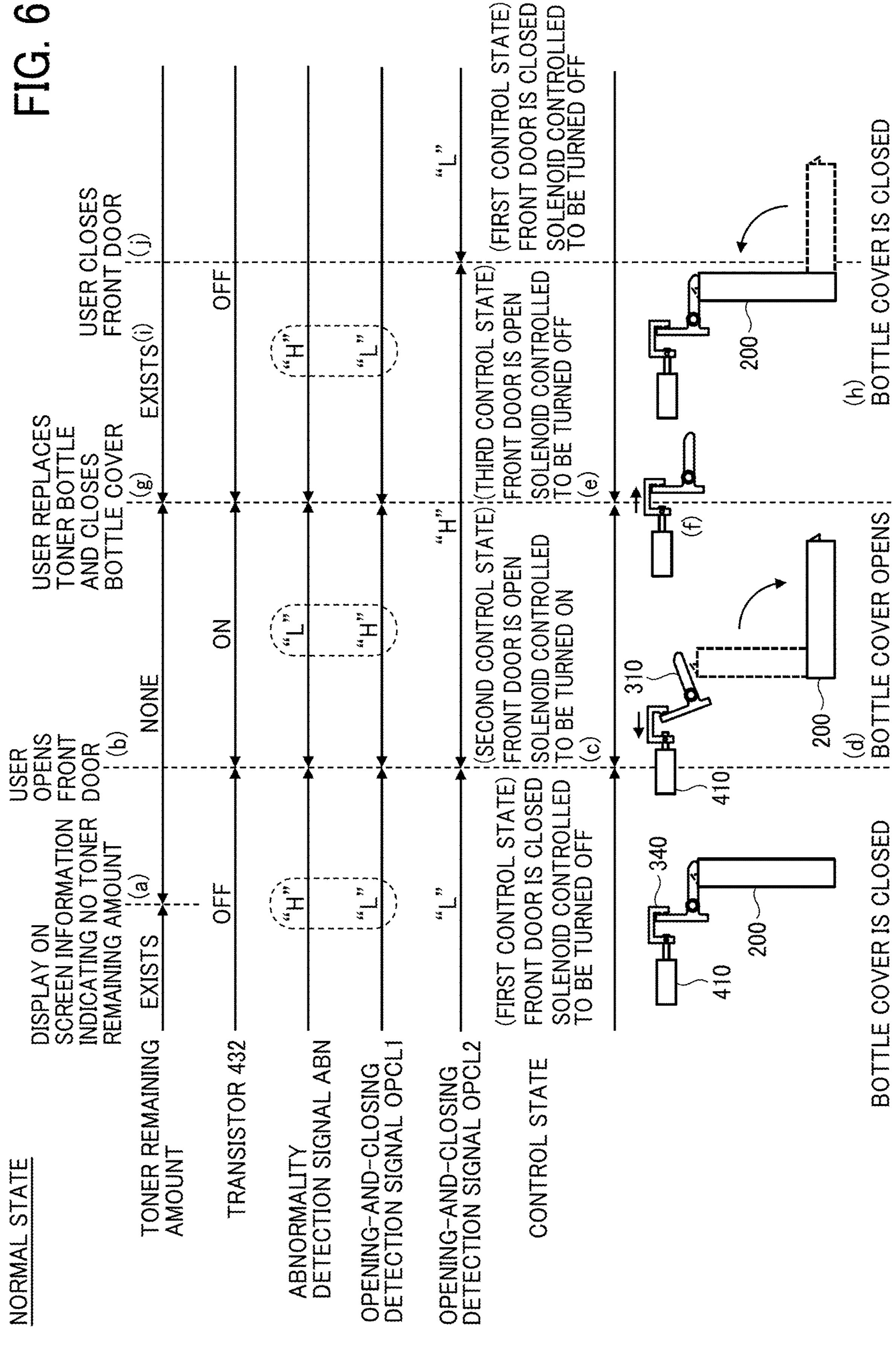
FIG. 6 is an explanatory diagram illustrating an example of a state transition of a solenoid controller at a time of replacing a toner bottle when the drive mechanism of FIG. 3 is normal.

FIG. 6 is an explanatory diagram illustrating an example of a state transition of the solenoid controller 430 at the time of replacing the toner bottle 10 when the drive mechanism 400 of FIG. 3 is normal. FIGS. 6 to 11 illustrate examples when any of the four toner bottles 10 is replaced. The logical value of the abnormality detection signal ABN and the logical value of the opening-and-closing detection signal OPCL1 for each of the first control state, the second control state, and the third control state are the same as the logical values in the normal state of FIG. 5.

In FIGS. 6 to 11, in order to simplify the description, it is assumed that the time during which the bottle cover 200 is locked by the latch 310 is equal to the time from the user opening the front door 160 to the user replacing the toner bottle 10 and closing the bottle cover 200. In practice, the time during which the bottle cover 200 is locked by the latch 310 is shorter than the time from the user opening the front door 160 to the user replacing the toner bottle 10 and closing the bottle cover 200. In addition, for example, the opening of the front door 160 by the user, the turning on of the transistor 432, and the change of the opening-and-closing detection signal OPCL1 to the high level H due to the opening of the bottle cover 200 by the user are made sequentially.

The image forming apparatus 100 of FIG. 1 includes a toner remaining amount detection unit that detects that the toner remaining amount of each toner bottle 10 has run out. In a case where it is detected that the toner remaining amount has run out, the image forming apparatus 100 displays information indicating "no toner remaining amount" on the screen of the operation panel 132 ((a) of FIG. 6). The user who has viewed the screen opens the front door 160 ((b) of FIG. 6).

When the front door 160 is opened, the opening-and-closing detection signal OPCL2 changes to the high level H. Based on the opening-and-closing detection signal OPCL2 at the high level H, the microcomputer 436 performs an on-control to turn on the transistor and cause a current to flow through the solenoid 410 ((c) of FIG. 6). Thus, the engagement of the bottle cover 200 by the latch 310 is released, and the bottle cover 200 opens ((d) of FIG. 6).

After performing the on-control of the solenoid 410 for a predetermined time, the microcomputer 436 performs an off-control to turn off the transistor 432 and stop the current flowing through the solenoid 410 ((e) of FIG. 6). Thus, the link 340 moves in the direction B by the pressing force of the coil spring 350, and the latch 310 rotates to a position to engage the bottle cover 200 ((f) of FIG. 6).

After the bottle cover 200 is opened, the user replaces the toner bottle 10 and closes the bottle cover 200 ((g) and (h) of FIG. 6). When the toner bottle 10 is replaced, the toner remaining amount detection unit detects that there is a toner remaining amount ((i) of FIG. 6). After replacing the toner bottle 10, the user closes the front door 160 and finishes the replacement work of the toner bottle 10 ((j) of FIG. 6).

Figure 7:
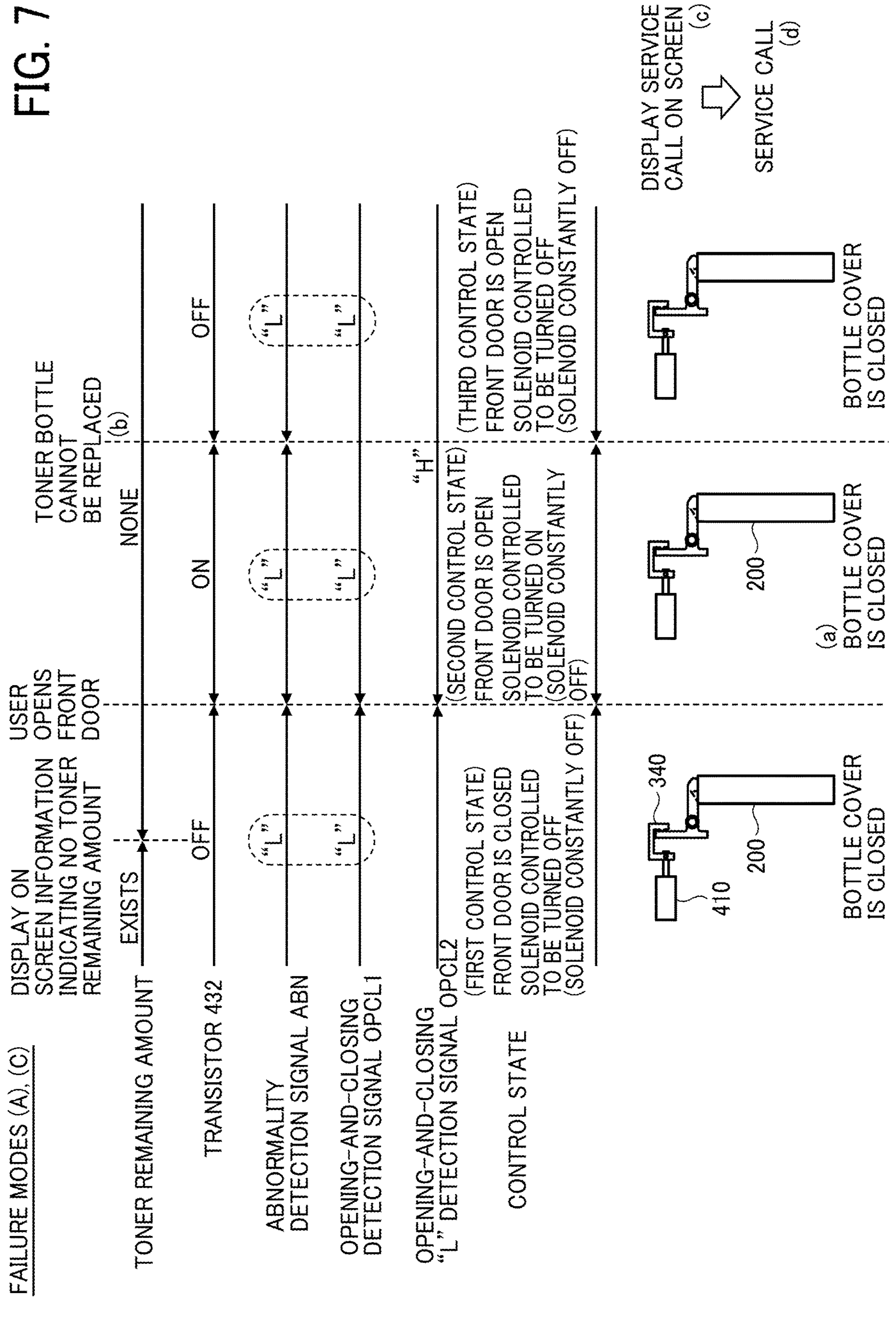
FIG. 7 is an explanatory diagram illustrating an example of a state transition of the solenoid controller at a time of replacing a toner bottle when the drive mechanism of FIG. 3 is abnormal.

FIG. 7 is an explanatory diagram illustrating an example of a state transition of the solenoid controller 430 at the time of replacing the toner bottle 10 when the drive mechanism 400 of FIG. 3 is abnormal. Detailed description of the same or similar operation as in FIG. 6 will be omitted. FIG. 7 illustrates an example of a case where the failure mode (A) indicating disengagement or disconnection of the harnesses 421 and 422 or the failure mode (C) indicating a ground fault on the source side of the harness 421 occurs.

In a case where the harnesses 421 and 422 are disengaged or disconnected, or a ground fault on the source side of the harness 421 occurs, no current flows through the solenoid 410 even when the transistor 432 is turned on. Therefore, even in the second control state, the engagement between the hook 202 of the bottle cover 200 and the latch 310 is not released, and the bottle cover 200 is maintained in the closed state ((a) of FIG. 7). Since the bottle cover 200 is not opened, the user cannot replace the toner bottle 10 ((b) of FIG. 7).

When detecting the occurrence of the failure mode (A) or the failure mode (C) based on the logic values of the abnormality detection signal ABN and the opening-and-closing detection signal OPCL1, the microcomputer 436 determines the disengagement or disconnection of the harnesses 421 and 422 or the ground fault on the source side of the harness 421 as an abnormal part. Thus, the microcomputer 436 instructs the controller 180 to display information indicating "service call" on the screen of the operation panel 132 ((c) of FIG. 7). The user who has viewed the screen makes a service call to repair the image forming apparatus 100 ((d) of FIG. 7).

When detecting the occurrence of the failure mode (A) or the failure mode (C), the microcomputer 436 stores the failure information indicating the disengagement or disconnection of the harnesses 421 and 422 and the ground fault on the source side of the harness 421 in a nonvolatile memory. The nonvolatile memory that stores the failure information may be built in the microcomputer 436 or may be mounted on the image forming apparatus 100.

In this manner, the microcomputer 436 automatically determines a component causing an abnormality at the time of replacement work of the toner bottle 10, and stores the component information as failure information indicating an abnormal part. Therefore, a service engineer who repairs the image forming apparatus 100 based on the service call can easily infer the component causing the failure by referring to the failure information held in the image forming apparatus 100. Therefore, it is possible to shorten the time until the failed part is found and the time spent on repair as compared with the related art. As a result, the downtime of the image forming apparatus 100 can be reduced as compared with the related art.

Figure 8:
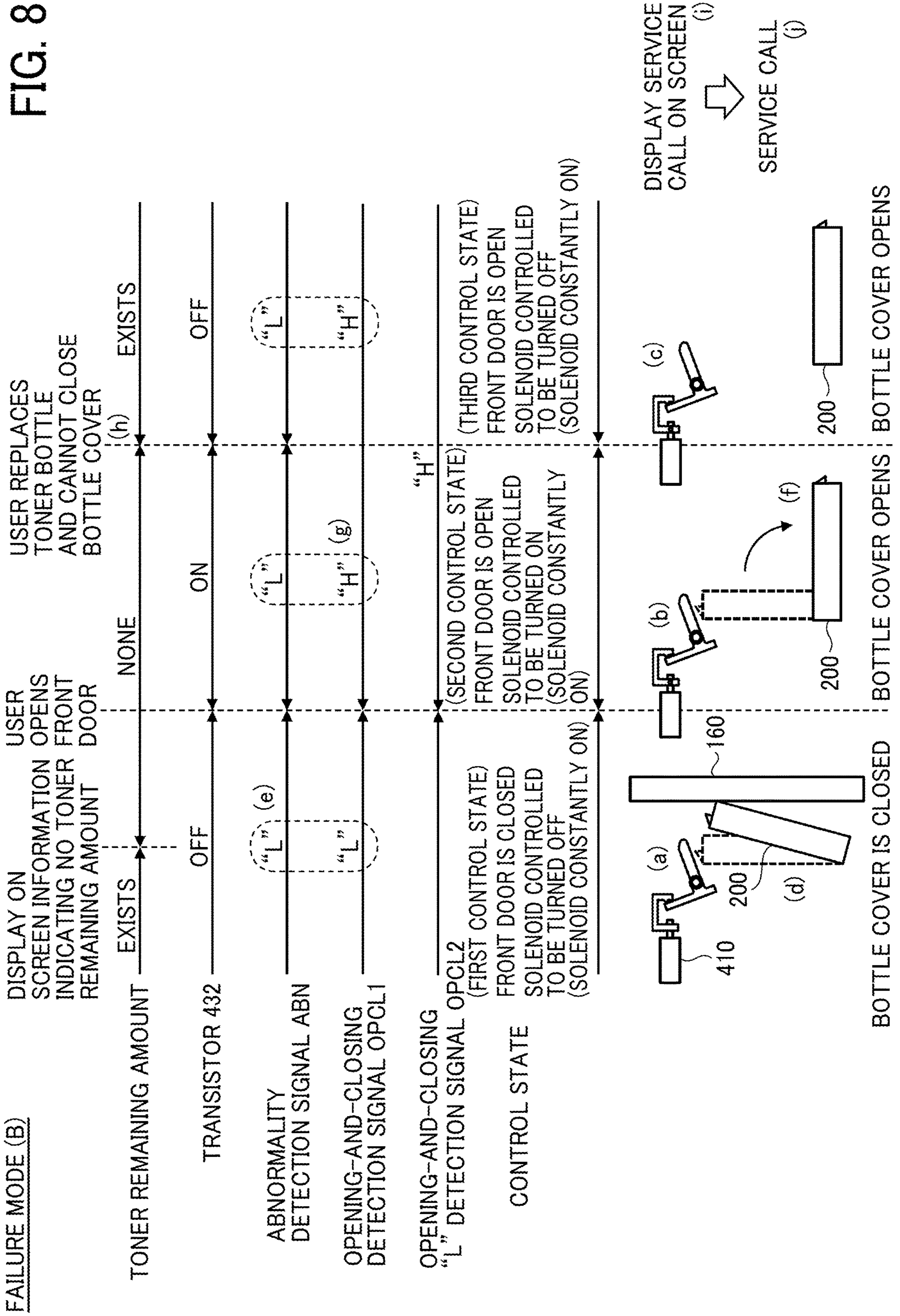
FIG. 8 is an explanatory diagram illustrating another example of a state transition of the solenoid controller at a time of replacing a toner bottle when the drive mechanism of FIG. 3 is abnormal.

FIG. 8 is an explanatory diagram illustrating another example of a state transition of the solenoid controller 430 at the time of replacing the toner bottle 10 when the drive mechanism 400 of FIG. 3 is abnormal. Detailed description of the same or similar operation as in FIG. 6 will be omitted. FIG. 8 illustrates an example of a case where the failure mode (B) indicating a ground fault on the sink side of the harness 421 occurs.

When a ground fault occurs on the sink side of the harness 421, not only in the second control state in which the transistor 432 is turned on, but also in the first control state and the third control state, a current constantly flows through the solenoid 410, and the solenoid 410 is constantly turned on. Therefore, the engagement between the hook 202 of the bottle cover 200 and the latch 310 is constantly released ((a), (b), and (c) of FIG. 8).

However, in the first control state, the bottle cover 200 leans on the closed front door 160 ((d) of FIG. 8). Therefore, the opening-and-closing detection sensor 210 of the bottle cover 200 continues to detect the closed state, and the opening-and-closing detection signal OPCL1 is maintained at the low level L ((e) of FIG. 8).

When the user opens the front door 160 based on the display of "no toner remaining amount", the restriction by the front door 160 is released, the bottle cover 200 is opened, and the opening-and-closing detection signal OPCL1 changes to the high level H ((f) and (g) of FIG. 8). The user tries to close the bottle cover 200 after replacing the toner bottle 10, but cannot close the bottle cover 200 because the engagement between the hook 202 and the latch 310 is constantly released ((h) of FIG. 8).

When detecting the occurrence of the failure mode (B) based on the logic values of the abnormality detection signal ABN and the opening-and-closing detection signal OPCL1, the microcomputer 436 determines the ground fault on the sink side of the harness 421 as an abnormal part. As in FIG. 7, information indicating a "service call" is displayed on the screen of the operation panel 132, and a service call for repairing the image forming apparatus 100 is made ((i) and (j) of FIG. 8).

Figure 9:
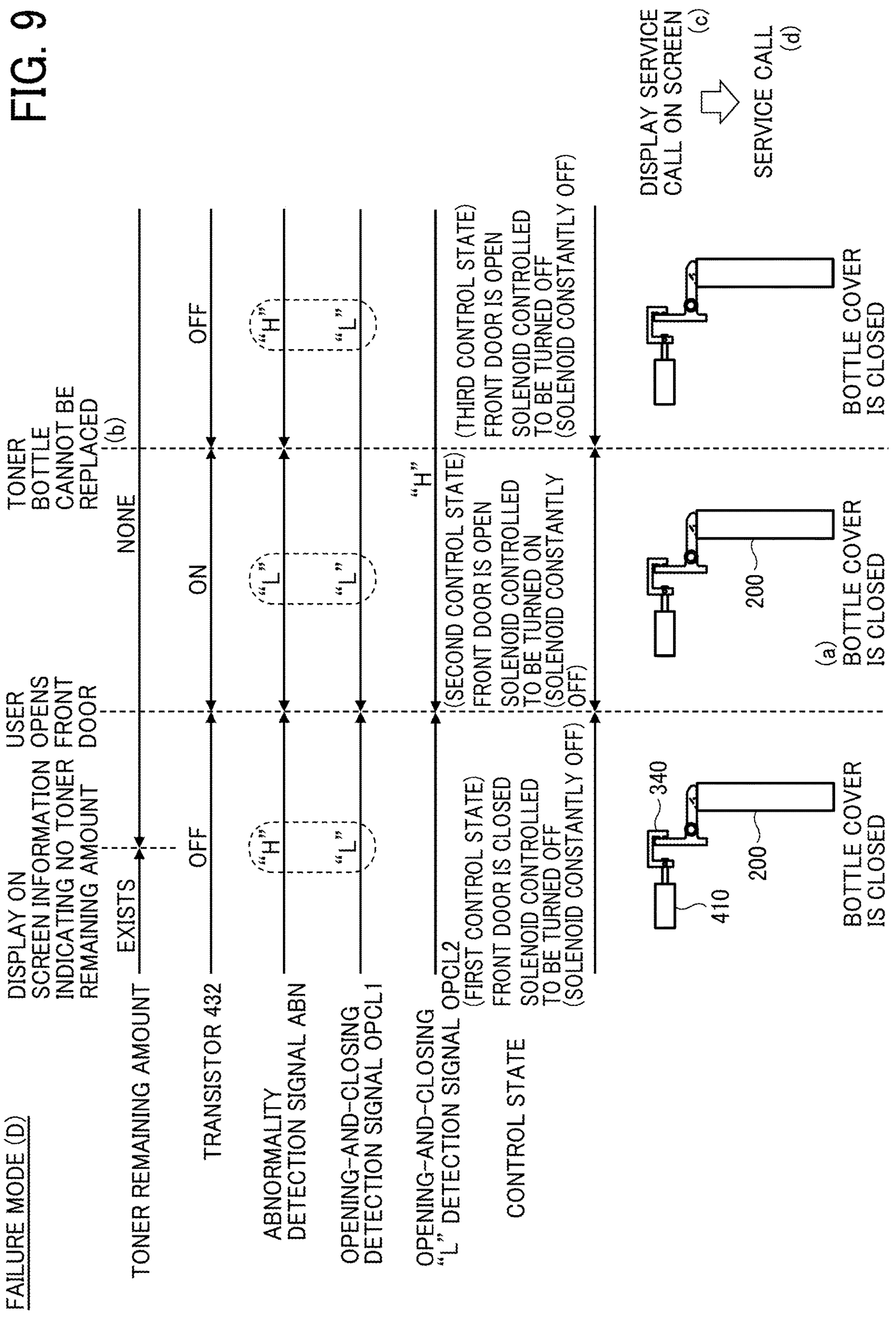
FIG. 9 is an explanatory diagram illustrating still another example of a state transition of the solenoid controller at a time of replacing a toner bottle when the drive mechanism of FIG. 3 is abnormal.

FIG. 9 is an explanatory diagram illustrating still another example of a state transition of the solenoid controller 430 at the time of replacing the toner bottle 10 when the drive mechanism 400 of FIG. 3 is abnormal. Detailed description of the same or similar operation as in FIGS. 6 and 7 will be omitted. FIG. 9 illustrates an example of a case where the failure mode (D) indicating a short circuit of the solenoid 410 occurs.

When a short-circuit failure occurs in the solenoid 410, no current flows through the solenoid 410, and thus, the solenoid 410 is constantly turned off. Therefore, even in the second control state, the engagement between the hook 202 of the bottle cover 200 and the latch 310 is not released, and the bottle cover 200 is maintained in the closed state ((a) of FIG. 9).

Since the bottle cover 200 is not opened, as in FIG. 7, the user cannot replace the toner bottle 10 ((b) of FIG. 9). When detecting the occurrence of the failure mode (D) based on the logic values of the abnormality detection signal ABN and the opening-and-closing detection signal OPCL1, the microcomputer 436 determines a short circuit of the solenoid 410 as an abnormal part. As in FIG. 7, information indicating a "service call" is displayed on the screen of the operation panel 132, and a service call for repairing the image forming apparatus 100 is made ((c) and (d) of FIG. 9).

Figure 10:
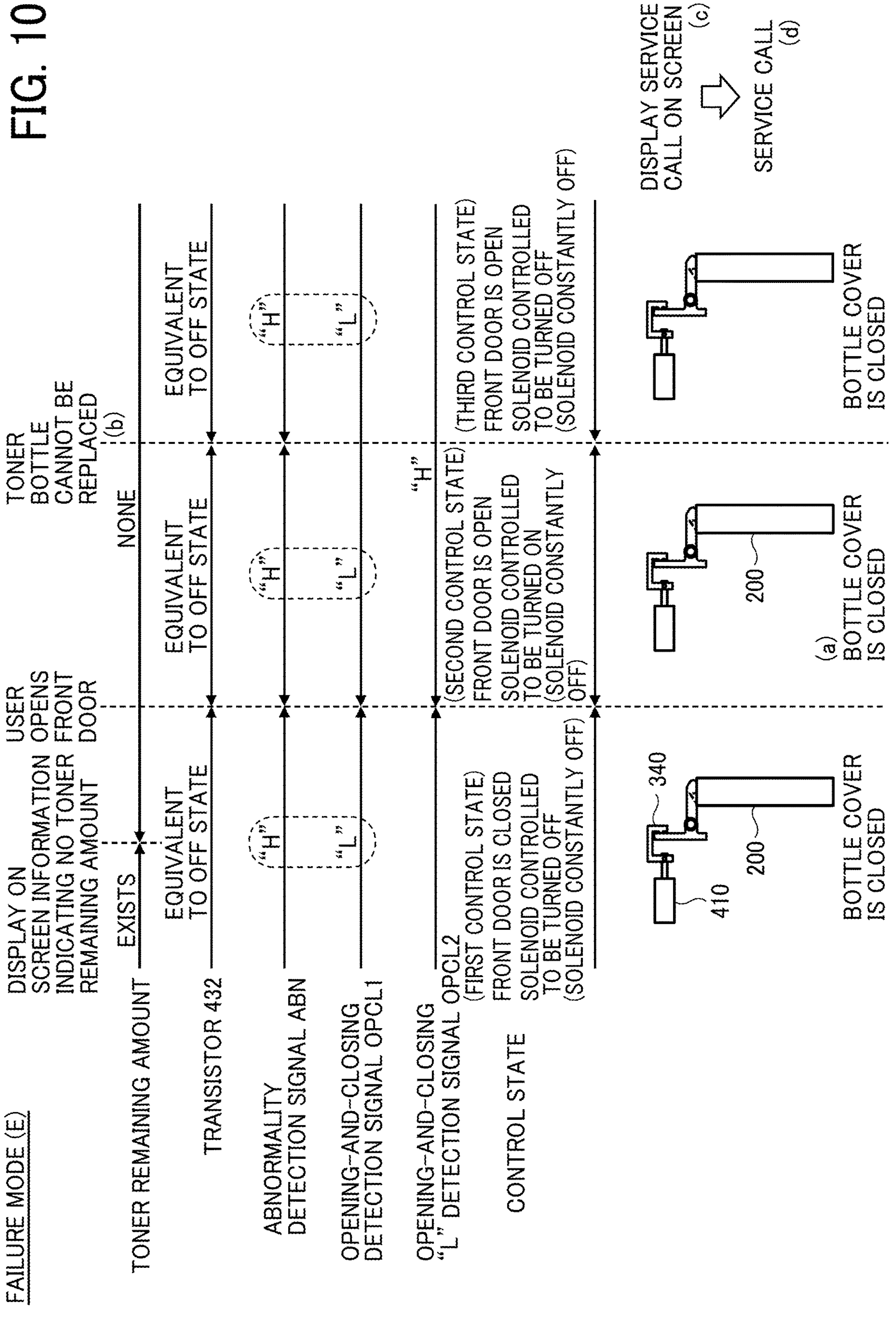
FIG. 10 is an explanatory diagram illustrating an example of a state transition of the solenoid controller at a time of replacing a toner bottle when the drive mechanism of FIG. 3 is abnormal.

FIG. 10 is an explanatory diagram illustrating an example of a state transition of the solenoid controller 430 at the time of replacing the toner bottle 10 when the drive mechanism 400 of FIG. 3 is abnormal. Detailed description of the same or similar operation as in FIGS. 6, 7, and 9 will be omitted. FIG. 9 illustrates an example of a case where the failure mode (E) indicating an open failure of the transistor 432 occurs.

In a case where an open failure occurs in the transistor 432, even when the microcomputer 436 outputs a high level to the base of the transistor 432, the state of the transistor 432 becomes a state equivalent to the OFF state. Therefore, no current flows through the solenoid 410, and even in the second control state, the engagement between the hook 202 of the bottle cover 200 and the latch 310 is not released, and the bottle cover 200 is maintained in the closed state ((a) of FIG. 10).

Since the bottle cover 200 is not opened, as in FIG. 7, the user cannot replace the toner bottle 10 ((b) of FIG. 10). When detecting the occurrence of the failure mode (E) based on the logic values of the abnormality detection signal ABN and the opening-and-closing detection signal OPCL1, the microcomputer 436 determines the open failure of the transistor 432 as an abnormal part. As in FIG. 7, information indicating a "service call" is displayed on the screen of the operation panel 132, and a service call for repairing the image forming apparatus 100 is made ((c) and (d) of FIG. 10).

Figure 11:
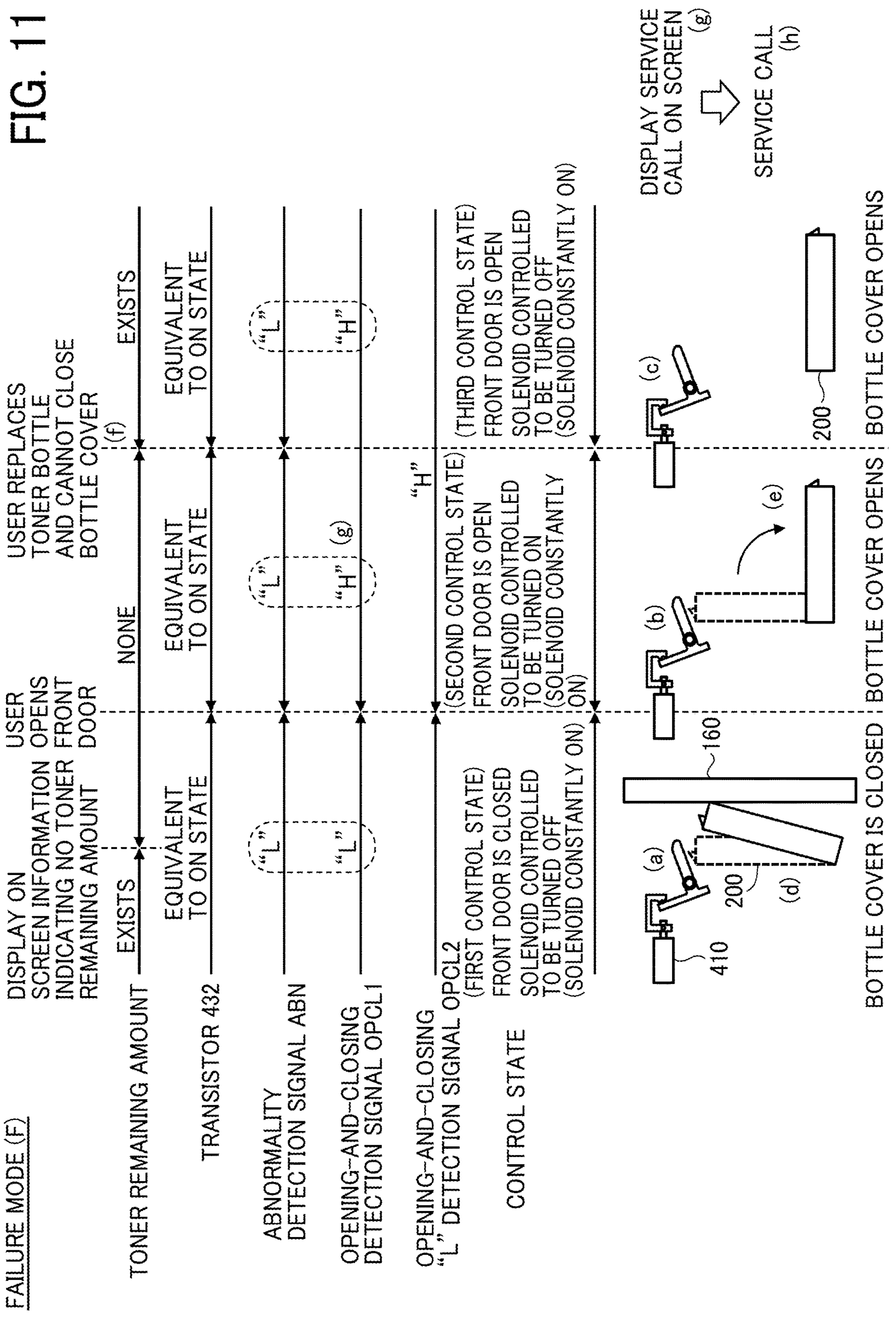
FIG. 11 is an explanatory diagram illustrating an example of a state transition of the solenoid controller at a time of replacing a toner bottle when the drive mechanism of FIG. 3 is abnormal.

FIG. 11 is an explanatory diagram illustrating an example of a state transition of the solenoid controller 430 at the time of replacing the toner bottle 10 when the drive mechanism 400 of FIG. 3 is abnormal. Detailed description of the same or similar operation as in FIGS. 6 and 8 will be omitted. FIG.

11 illustrates an example of a case where the failure mode (F) indicating a short-circuit failure of the transistor 432 occurs.

When a short-circuit failure occurs in the transistor 432, regardless of the base voltage of the transistor 432, a current flows between the collector and the emitter of the transistor 432 and a state equivalent to the on state is obtained. Therefore, similarly to FIG. 8, the solenoid 410 is constantly turned on, and the engagement between the hook 202 of the bottle cover 200 and the latch 310 is constantly released ((a), (b), and (c) of FIG. 11). The operation in FIG. 11 is the same as that in FIG. 8 except that the transistor 432 is in a state equivalent to the ON state.

For example, in the first control state, the bottle cover 200 leans on the closed front door 160 ((d) of FIG. 11). When the user opens the front door 160 based on the display of "no toner remaining amount", the bottle cover 200 opens ((e) of FIG. 11). The user tries to close the bottle cover 200 after replacing the toner bottle 10, but cannot close the bottle cover 200 because the engagement between the hook 202 and the latch 310 is constantly released ((f) of FIG. 11).

When detecting the occurrence of the failure mode (F) based on the logic values of the abnormality detection signal ABN and the opening-and-closing detection signal OPCL1, the microcomputer 436 determines the short-circuit failure of the transistor 432 as an abnormal part. As in FIG. 7, information indicating a "service call" is displayed on the screen of the operation panel 132, and a service call for repairing the image forming apparatus 100 is made ((g) and (h) of FIG. 11).

As described above, in this embodiment, the microcomputer 436 detects the failure mode based on the logical values of the abnormality detection signal ABN and the opening-and-closing detection signal OPCL1 to determine the abnormal part of the drive mechanism 400. That is, the microcomputer 436 can automatically determine the component causing the abnormality at the time of replacement work of the toner bottle 10 without making an inquiry to the user. Therefore, when an abnormality occurs in the lock mechanism 300 that locks the bottle cover 200, it is possible to quickly repair the abnormality and reduce the downtime of the image forming apparatus 100 by making it possible to determine a failed component of the drive mechanism 400 that drives the lock mechanism 300.

For example, when determining an abnormal component, the microcomputer 436 stores failure information indicating an abnormal part in the nonvolatile memory or the like, and instructs the controller 180 to display information indicating a "service call" on the screen of the operation panel 132. Therefore, a service engineer who repairs the image forming apparatus 100 based on the service call can easily infer the component causing the failure by referring to the failure information held in the image forming apparatus 100. Therefore, it is possible to shorten the time until the failed part is found and the time spent on repair as compared with the related art.

As illustrated in FIG. 5, the microcomputer 436 detects the logical values of the abnormality detection signal ABN and the opening-and-closing detection signal OPCL1 for each control state that is a combination of the open or closed state of the front door 160 and the ON/OFF control state of the solenoid. Thus, the microcomputer 436 can more specifically distinguish the failure part as compared with the case where the open and closed states of front door 160 are not used for abnormality determination.

The microcomputer 436 receives the logic value of the abnormality detection signal ABN that is generated based on the voltage generated on the sink side of the solenoid 410 connected to the collector of the transistor 432. By directly receiving a voltage generated inside the drive mechanism 400 as the abnormality detection signal ABN, it is possible to more accurately determine a failed component of the drive mechanism 400.

The abnormality detector 434 outputs a voltage obtained by dividing the collector voltage by a voltage divider provided between the collector of the transistor 432 (the sink side of the solenoid 410) and the ground line to the microcomputer 436 as the abnormality detection signal ABN. Thus, the operating state of the drive mechanism 400 including the solenoid 410, the harnesses 421 and 422, and the transistor 432 can be detected. By combining the operating state of the drive mechanism 400 with the open and closed states of the front door 160 and the bottle cover 200, it is possible to more specifically determine the part where the abnormality of the drive mechanism 400 has occurred. Even when the power supply voltage for the solenoid 410 exceeds the rated input voltage of the microcomputer 436, an appropriate voltage can be output to the microcomputer 436 as the abnormality detection signal ABN.

When determining an abnormal part of the drive mechanism 400, the microcomputer 436 stores failure information indicating the determined abnormal part in the nonvolatile memory, and instructs the controller 180 to display information indicating a service call on the screen of the operation panel 132. With the storage of the failure information in the nonvolatile memory and the service call, subsequent repair can be performed quickly, and the downtime of the image forming apparatus 100 can be shortened.

The abnormality of a lock mechanism may be caused by, for example, a failure of a solenoid, a failure of a harness connected to the solenoid, or a component used in a drive mechanism that drives the lock mechanism such as a drive element that drives the solenoid. For this reason, when the component that is the cause of the failure is unknown in a case where an abnormality in which the lock of the bottle cover cannot be released occurs, a normal component that is not the cause of the abnormality might be replaced at the time of repair. In addition, in a case where the component causing the abnormality cannot be distinguished, for example, in a case of replacing related components one by one to identify a failed component, the repair time may increase and the downtime of the image forming apparatus may increase.

As described above, according to one or more embodiments of the present disclosure, even if an abnormality occurs in a lock mechanism that locks a bottle cover, a component that is the cause of the abnormality in a drive mechanism that drives the lock mechanism can be identified, and the downtime of an image forming apparatus can be reduced.

Note that, in the above-described embodiments, an example of the image forming apparatus 100 has been described, but the present disclosure may be applied to other apparatuses having the configurations illustrated in FIGS. 2, 3, and 4.

Aspects of the present disclosure are, for example, as follows.

First Aspect

An image forming apparatus includes: an image former to form an image; a toner bottle holder to hold a toner bottle filled with toner used for image formation by the image former in a manner that the toner bottle is insertable to and removable from the toner bottle holder; a bottle cover that covers an insertion port of the toner bottle holder and is openable and closable with respect to the insertion port; a lock mechanism to lock the bottle cover at a position at which the bottle cover covers the insertion port; a drive mechanism to drive the lock mechanism to release a locked state of the bottle cover; an abnormality detector to generate an abnormality detection signal when the abnormality detector detects an abnormality of the drive mechanism; a cover opening-and-closing detection sensor to detect an open state and a closed state of the bottle cover and generate a cover opening-and-closing detection signal indicating the open state or the closed state of the bottle cover; and a determination unit to determine an abnormal part of the drive mechanism based on the abnormality detection signal and the cover opening-and-closing detection signal.

Second Aspect

The image forming apparatus according to the first aspect further includes: a front door that is disposed on a front surface of the bottle cover in an openable and closable manner to prevent the bottle cover from opening when the bottle cover is in a closed state; and a door opening-and-closing detection sensor to detect an open state and a closed state of the front door. the determination unit determines the abnormal part of the drive mechanism based on logic values of the abnormality detection signal and the cover opening-and-closing detection signal in each of a first control state in which the bottle cover is controlled to the locked state by the drive mechanism in the closed state of the front door, a second control state in which the bottle cover is controlled to an unlocked state by the drive mechanism in the open state of the front door, and a third control state in which the bottle cover is controlled to the locked state in the open state of the front door.

Third Aspect

In the image forming apparatus according to the first or second aspect, the bottle cover includes a locking portion. The lock mechanism includes: an engagement member including an engagement portion to engages the locking portion at the position at which the bottle cover covers the insertion port; and a pressing member to press the engagement member to a position at which the engagement portion engages the locking portion. The drive mechanism includes: a solenoid to move the engagement member in a direction of releasing an engagement of the engagement portion and the locking portion against a pressing force of the pressing member at a time of driving; and a transistor that is connected to a sink side of the solenoid and is turned on when a drive current flows from a source side of the solenoid to the sink side. The abnormality detector generates the abnormality detection signal based on a voltage generated on the sink side of the solenoid.

Fourth Aspect

In the image forming apparatus according to the third aspect, the abnormality detector includes a voltage divider to divide a voltage generated on the sink side to generate a divided voltage, and the determination unit receives the divided voltage as the abnormality detection signal.

Fifth Aspect

The image forming apparatus according to any one of the first to fourth aspects further includes a display to display various types of information. When the determination unit determines the abnormal part of the drive mechanism, the determination unit stores failure information indicating the abnormal part that has been determined in a nonvolatile memory, and causes the display to display a message indicating that a repair is necessary.

Sixth Aspect

An abnormality determination device determines an abnormal part of a drive mechanism and is to be installed in an apparatus that includes: a toner bottle holder to hold a toner bottle filled with toner in a manner that the toner bottle is insertable to and removable from the toner bottle holder; a bottle cover that covers an insertion port of the toner bottle holder and is openable and closable with respect to the insertion port; a lock mechanism to lock the bottle cover at a position at which the bottler cover covers the insertion port; and a drive mechanism to drive the lock mechanism to release a locked state the bottle cover. The abnormality determination device includes: an abnormality detector to generate an abnormality detection signal when the abnormality detector detects an abnormality of the drive mechanism; a cover opening-and-closing detection sensor to detect an one state and a closed state of the bottle cover and generate a cover opening-and-closing detection signal indicating the open state or the closed state of the bottle cover; and a determination unit to determine an abnormal part of the drive mechanism based on the abnormality detection signal and the cover opening-and-closing detection signal.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus, comprising:

an image former including a photosensitive drum, the image former configured to form an image;

a toner bottle holder including a frame in which an insertion port is formed, the toner bottle holder configured to hold a toner bottle filled with toner used for image formation by the image former in a manner that the toner bottle is insertable to and removable from the toner bottle holder;

a bottle cover rotatably fixed to the frame by a shaft member, the bottle cover configured to cover the insertion port of the toner bottle holder, the bottle cover being openable and closable with respect to the insertion port;

a lock mechanism including a latch configured to lock the bottle cover at a position at which the bottle cover covers the insertion port;

a drive mechanism including a solenoid configured to drive the lock mechanism to release a locked state of the bottle cover;

a front door disposed in front of the bottle cover in an openable and closable manner to prevent the bottle cover from opening when the bottle cover is in the closed state;

processing circuitry configured to generate an abnormality detection signal in response to detecting an abnormality of the drive mechanism;

receive a cover opening-and-closing detection signal indicating an open state or a closed state of the bottle cover from a sensor attached to the bottle cover;

perform a first evaluation to identify logic values of the abnormality detection signal and the cover opening-and-closing detection signal, in each of a first control state, a second control state, and a third control state, during a bottle replacement operation performed when the drive mechanism is in a normal state, the first control state being a state in which the bottle cover is controlled to the locked state by the drive mechanism in the closed state of the front door, the second control state being a state in which the bottle cover is controlled to an unlocked state by the drive mechanism in the open state of the front door, and the third control state being a state in which the bottle cover is controlled to the locked state by the drive mechanism in the open state of the front door;

perform a second evaluation to identify logic values of the abnormality detection signal and the cover opening-and-closing detection signal, in each of the first control state, the second control state, and the third control state, during a most recent bottle replacement operation; and determine an abnormal part of the drive mechanism based on a result of the first evaluation and a result of the second evaluation.

2. The image forming apparatus according to claim 1, wherein the bottle cover includes a locking portion, the lock mechanism further includes:

a recess formed in the latch, the recess configured to engage the locking portion at the position at which the bottle cover covers the insertion port; and a spring member configured to press the latch to a position at which the recess engages the locking portion, the solenoid of the drive mechanism moves the latch in a direction of releasing an engagement of the recess and the locking portion against a pressing force of the spring pressing member at a time of driving, the drive mechanism further includes a transistor that is connected to a sink side of the solenoid and is turned on when a drive current flows from a source side of the solenoid to the sink side, and the processing circuitry generates the abnormality detection signal based on a voltage generated on the sink side of the solenoid.

3. The image forming apparatus according to claim 2, wherein the voltage generated on the sink side is divided to generate a divided voltage, and the processing circuitry is configured to receive the divided voltage as the abnormality detection signal.

4. The image forming apparatus according to claim 1, further comprising a display configured to display various types of information, wherein when the processing circuitry determines the abnormal part of the drive mechanism, the processing circuitry stores failure information indicating the abnormal part that has been determined in a nonvolatile memory, and causes the display to display a message indicating that a repair is necessary.

5. An abnormality determination device configured to determine an abnormal part and to be installed in an apparatus including: a toner bottle holder including a frame in which an insertion port is formed, the toner bottle holder configured to hold a toner bottle filled with toner in a manner that is insertable to and removable from the toner bottle holder; a bottle cover rotatably fixed to the frame by a shaft member, the bottle cover configured to cover the insertion port of the toner bottle holder, the bottle cover being openable and closable with respect to the insertion port; a lock mechanism including a latch configured to lock the bottle cover at a position at which the bottle cover covers the insertion port; a drive mechanism including a solenoid configured to drive the lock mechanism to release a locked state of the bottle cover; and a front door disposed in front of the bottle cover in an openable and closable manner to prevent the bottle cover from opening when the bottle cover is in the closed state, the abnormality determination device comprising:

processing circuitry configured to generate an abnormality detection signal in response to detecting an abnormality of the drive mechanism;

receive a cover opening-and-closing detection signal indicating an open state or a closed state of the bottle cover from a sensor attached to the bottle cover;

perform a first evaluation to identify logic values of the abnormality detection signal and the cover opening-and-closing detection signal, in each of a first control state, a second control state, and a third control state, during a bottle replacement operation performed when the drive mechanism is in a normal state, the first control state being a state in which the bottle cover is controlled to the locked state by the drive mechanism in the closed state of the front door, the second control state being a state in which the bottle cover is controlled to an unlocked state by the drive mechanism in the open state of the front door, and the third control state being a state in which the bottle cover is controlled to the locked state by the drive mechanism in the open state of the front door;

perform a second evaluation to identify logic values of the abnormality detection signal and the cover opening-and-closing detection signal, in each of the first control state, the second control state, and the third control state, during a most recent bottle replacement operation; and determine an abnormal part of the drive mechanism based on a result of the first evaluation and a result of the second evaluation.

* * * * *